United States Patent [19]

Kasenga et al.

[11] Patent Number: 5,076,964
[45] Date of Patent: Dec. 31, 1991

[54] PROCESS FOR PRODUCING CERIUM ACTIVATED YTTRIUM GALLIUM ALUMINATE CRT PHOSPHOR

[75] Inventors: Anthony F. Kasenga, Towanda; Olney B. Bullock, Jr., Rome; Joseph J. Lenox, Towanda, all of Pa.

[73] Assignee: GTE Products Corporation, Stamford, Conn.

[21] Appl. No.: 607,978

[22] Filed: Nov. 1, 1990

[51] Int. Cl.$^5$ ............................................. C09K 11/80
[52] U.S. Cl. .............................................. 252/301.4 R
[58] Field of Search ................................. 252/301.4 R

[56] References Cited

U.S. PATENT DOCUMENTS 4,246,630 1/1981 Wolfe .......................... 252/301.4 R
4,479,886 10/1984 Kasenga ..................... 252/301.4 R
4,818,433 4/1989 Sigai et al. .................. 252/301.4 R

FOREIGN PATENT DOCUMENTS 1174518 12/1969 United Kingdom ......... 252/301.4 R

Primary Examiner—Jack Cooper
Attorney, Agent, or Firm—Elizabeth A. Levy

[57] ABSTRACT

A process for producing cerium activated yttrium gallium aluminate phosphor comprises dry blending yttrium oxide, gallium oxide, cerium oxide, and unmilled aluminum hydroxide wherein the aluminum hydroxide is a small particle size aluminum hydroxide wherein the 50% size as measured by Coulter Counter 2 minute stir technique using about a 100 micrometer aperture is about 10.8±5 micrometers in diameter and by Coulter Counter 5 minute sonic technique using about a 100 micrometer aperture is about 9.3±3 micrometers in diameter to form a uniform mixture thereof, and firing the mixture in air at a temperature of about 1550° C. to about 1625° C. for about 4 hours to 8 hours to produce a once-fired phosphor wherein the brightness is at least about 24% higher than phosphors produced using milled aluminum hydroxide that is large in particle size than the small size aluminum hydroxide. By refiring the phosphor, the brightness is further increased by at least about 14% over the once-fired phosphor. When the firing temperature is about 1625° C. to 1700° C. the brightness of the once-fired phosphor is increased by at least about 34% over phosphors produced using larger particle size aluminum hydroxide. In the latter case, the refired phosphor is at least about 10% brighter than the once-fired phosphor.

4 Claims, No Drawings

PROCESS FOR PRODUCING CERIUM ACTIVATED YTTRIUM GALLIUM ALUMINATE CRT PHOSPHOR

BACKGROUND OF THE INVENTION

This invention relates to a process for producing cerium activated yttrium gallium aluminate CRT phosphor which involves using a specific type of aluminum hydroxide as one of the starting materials. The aluminum hydroxide is unmilled and has a specific relatively small starting particle size. Use of this type of aluminum hydroxide according to the conditions of the present invention even with one firing results in higher brightness in the phosphor over phosphors produced using unmilled aluminum hydroxide of higher particle size as a starting material, with two firings.

Cerium activated yttrium gallium aluminate phosphor is a yellow-green luminescent material with a short persistance under CRT excitation. This material is used in a flying-spot scanner tube. Under these applications a high CRT luminescence efficiency and a small particle size is desired.

SUMMARY OF THE INVENTION

In accordance with one aspect of the invention, there is provided a process for producing cerium activated yttrium gallium aluminate phosphor which comprises dry blending yttrium oxide, gallium oxide, cerium oxide, and unmilled aluminum hydroxide wherein the aluminum hydroxide is a small particle size aluminum hydroxide wherein the 50% size as measured by Coulter Counter 2 minute stir technique using about a 100 micrometer aperture is about $10.8\pm5$ micrometers in diameter and by Coulter Counter 5 minute sonic technique using about a 100 micrometer aperture is about $9.3\pm3$ micrometers in diameter to form a uniform mixture thereof, and firing the mixture in air at a temperature of about 1550° C. to about 1625° C. for about 4 hours to 8 hours to produce a once-fired phosphor wherein the brightness is at least about 24% higher than phosphors produced using milled aluminum hydroxide that is larger in particle size than the small size aluminum hydroxide.

In accordance with another embodiment, by refiring the phosphor, the brightness is further increased by at least about 14% over the once-fired phosphor.

In accordance with another embodiment, when the firing temperature is about 1625° C. to 1700° C. the brightness of the once-fired phosphor is increased by at least about 34% over phosphors produced using larger particle size aluminum hydroxide. In this case the refired phosphor is at least about 10% brighter than the once-fired phosphor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The phosphor of the present invention is a cerium activated yttrium gallium aluminate phosphor typically having the formula $Y_3Al_xGa_yO_{12}:Ce$ wherein $x+y=5$, $x=1$ to 4, and $y=4$ to 1.

Yttrium oxide, gallium oxide, cerium oxide, and aluminum hydroxide are dry blended to form an intimate mixture. The amounts of these components are sufficient to result in formation of the above described phosphor upon firing. A typical mixture, although the invention is not limited to these amounts, consists essentially of in percent by weight about 42.98 $Y_2O_3$, about 31.56 $Al(OH)_3$, about 24.78 $Ga_2O_3$, and about 0.683 $CeO_2$. The blending is done by conventional dry blending techniques. A unique feature of the present invention is use of a special type of aluminum hydroxide. The aluminum hydroxide is of a small particle size. The particle size is as measured by Coulter Counter technique in which about a 100 micrometer aperture is used is about $10.8\pm5$ micrometers in diameter when the 2 minute stir size measurement is taken, and about $9.3\pm3$ micrometers in diameter when the 5 minute sonic size measurement is taken. These particle size measuring techniques are well known by those skilled in the art. This type of aluminum hydroxide does not have to be milled before use in the mixture. A preferred source of aluminum hydroxide is supplied by Alcoa called Type C-333. Previously aluminum hydroxide had a larger particle size and had to be milled prior to use. This often resulted in a slight decrease in brightness of the subsequently produced phosphor.

The phosphor can be produced by several methods according to the present invention. These will now be described.

In accordance with one embodiment, the mixture is fired once in air at a temperature of about 1550° C. to about 1625° C., and most preferably at about 1600° C. to produce the phosphor which will be referred to as a once-fired phosphor. The firing time is about 4 hours to about 8 hours. With the use of the small particle size aluminum hydroxide, the brightness of the resulting once-fired phosphor is at least about 24% higher than phosphors produced by the prior method which involved using aluminum hydroxide that is pre-milled and of a larger particle size, and which necessitated two firings.

The brightness of the phosphor produced by the above described method according to the present invention can be further improved with an additional firing. The once-fired phosphor is first ground such as by mortaring to eliminate any large chunks that may have formed in the first firing. The once-fired phosphor is then fired as described above. The brightness of the resulting re-fired phosphor is at least about 14% higher than the once-fired phosphor.

In accordance with another embodiment, the above described mixture of oxides and aluminum hydroxide is fired as described above except at a slightly higher temperature range of about 1625° C. to about 1700° C. With the use of the small particle size aluminum hydroxide, the brightness of the resulting once-fired phosphor is at least about 34% higher than phosphor produced by the above described prior method.

The brightness of the above once-fired phosphor can also be further improved with an additional firing. The once-fired phosphor is first ground such as by mortaring to eliminate any large chunks that may have formed in the first firing. The once-fired phosphor is then fired as described above at the higher temperature range of about 1625° C. to about 1700° C. The brightness of the resulting re-fired phosphor is at least about 10% higher than the phosphor which is fired once at the same temperature range.

The phosphor produced by the method of the present invention exhibits no detectable phase of $CeO_2$ by x-ray diffraction, and very minor phases of $Al_2O_3$ and $Ga_2Y_4O_9$ after the first firing. With the re-firing, there are no detectable $CeO_2$ or $Al_2O_3$ phases.

To more fully illustrate this invention, the following non-limiting example is presented.

EXAMPLE 1

About 650.33 g $Y_2O_3$, about 477.55 g $Al(OH)_3$, about 374.88 g $Ga_2O_3$, and about 10.33 g $CeO_2$ (mole ratio of 1.44 to 3.0 to 1.0 to 0.03) are blended together. The $Al(OH)_3$ material is unmilled Alcoa Type C-333. This blend is fired at about 1650° C. in air for about 6 hours. The fired material is broken up and lightly mortared and sieved. The brightness of the resulting phosphor is about 107.2% when used in a cathode ray tube (CRT) at about 7.6 particle size.

EXAMPLE 2

The same materials as in Example 1 are blended. The blend is fired two times at about 1600° C. for about 6 hours in air with mortaring between firings. The mortared material is then sieved. The brightness of the resulting phosphor is about 113.8% CRT at about 7.9 particle size.

EXAMPLE 3

The same materials as in Example 1 are blended. The blend is fired two times at about 1650° C. for about 6 hours in air with mortaring between firings. The mortared material is then sieved. The brightness of the resulting phosphor is about 118.5% CRT at about 9.2 particle size.

The summary of these results are given in Table 1.

TABLE 1

| # | Description | Al(OH)3 source | Firing Temp. °C. First | Firing Temp. °C. Second | Luminescent Properties CRT Br % | x | y | Coulter Counter 100μ 5 min sonic 50% |
|---|---|---|---|---|---|---|---|---|
| 1 | Measurement standard | | | | 100.0 | 0.299 | 0.528 | 5.2 |
| 2 | Prior method | Prior (milled 3 hrs) | 1600 | 1600 | 80.0 | 0.285 | 0.514 | 6.0 |
| 3 | New method | unmilled | 1600 | | 99.3 | 0.309 | 0.534 | 6.8 |
| 4 | " | " | 1600 | 1600 | 113.8 | 0.313 | 0.542 | 7.9 |
| 5 | " | " | 1650 | | 107.2 | 0.317 | 0.542 | 7.6 |
| 6 | " | " | 1650 | 1650 | 118.5 | 0.325 | 0.551 | 9.2 |

Counter 2 minute stir technique using about a 100 micrometer aperture is about 10.8±5 micrometers in diameter and by Coulter Counter 5 minute sonic technique using about a 100 micrometre aperture is about 9.3±3 micrometers in diameter to form a uniform mixture thereof; and b) firing said mixture in air at a temperature of about 1550° C. to about 1625° C. for about 4 hours to about 8 hours to produce a once-fired phosphor wherein the brightness is at least about 24% higher than the phospher produced as above but using milled aluminum hydroxide that is larger in particle size than said small particle size aluminum hydroxide.

2. A process of claim 1, comprising the additional step of refiring said phosphor in air at a temperature of about 1550° C. to about 1625° C. for about 4 hours to about 8 hours to produce a refired phosphor having an increase in brightness of at least about 14% over said once-fired phosphor.

3. A process for producing cerium activated yttrium gallium aluminate phosphor having the formula $Y_3Al_xGa_yO_{12}$:Ce wherein $x+y=5$, $x=1$ to 4, and $y=4$ to 1, said method comprising:

a) dry blending yttrium oxide, gallium oxide, cerium oxide, and unmilled aluminum hydroxide wherein said aluminum hydroxide is a small particle size aluminum hydroxide wherein the 50% size of said aluminum hydroxide as measured by Coulter Counter 2 minute stir technique using about a 100 micrometer aperture is about 10.8±5 micrometers in diameter and by Coulter Counter 5 minute sonic technique using about a 100 micrometer aperture is about 9.3±3 micrometers in diameter to form a uniform mixture thereof; and b) firing said mixture in air at a temperature of about 1625° C. to about 1700° C. for about 4 hours to about 8 hours to produce a once-fired phosphor wherein the brightness is at least about 34% higher than the phosphor produced as above but using milled aluminum hydroxide that is larger in particle size than said small particle size aluminum hydroxide.

4. A process of claim 3, comprising the additional step of refiring said phosphor in air at a temperature of about 1625° C. to about 1700° C. for about 4 hours to about 8 hours to produce a refired phosphor having an increase in brightness of at least about 10% over said once-fired phosphor.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing cerium activated yttrium gallium aluminate phosphor having the formula $Y_3Al_xGa_yO_{12}$:Ce wherein $x+y=5$, $x=1$ to 4, and $y=4$ to 1, said method comprising:

a) dry blending yttrium oxide, gallium oxide, cerium oxide, and unmilled aluminum hydroxide wherein said aluminum hydroxide is a small particle size aluminum hydroxide wherein the 50% size of said aluminum hydroxide as measured by Coulter

* * * * *